United States Patent [19]

Locke, Jr.

[11] 4,316,133
[45] Feb. 16, 1982

[54] TEMPERATURE COMPENSATED BATTERY CHARGING SYSTEM WITH TESTING FOR BATTERY BACK-UP SYSTEM

[75] Inventor: Philip F. Locke, Jr., Trafford, Pa.

[73] Assignee: Westinghouse Electric Corp., Pittsburgh, Pa.

[21] Appl. No.: 184,498

[22] Filed: Sep. 5, 1980

[51] Int. Cl.³ .............................. H02J 7/00; H02J 9/00
[52] U.S. Cl. ........................................ 320/48; 320/35; 307/66; 340/636
[58] Field of Search ...................... 307/66; 320/35, 36, 320/48, 3; 340/636

[56] References Cited

U.S. PATENT DOCUMENTS

| | | | |
|---|---|---|---|
| 3,596,106 | 7/1971 | Raddi | 307/66 |
| 3,833,817 | 9/1974 | Patel | 307/66 |
| 3,969,665 | 7/1976 | Rowas | 320/35 |
| 3,997,831 | 12/1976 | Hopfner | 320/48 |
| 4,147,969 | 4/1979 | Miller et al. | 320/48 X |
| 4,186,335 | 1/1980 | Cahill | 320/3 |

OTHER PUBLICATIONS

"Sealed Maintenance-Free Batteries", *The Primary Battery*, vol. 2, Cahoon & Heise (1976), pp. 371–377.
"Thermistor Temperature Sensing", *Nickel-Cadmium Battery Application Engineering Handbook*, 2nd Ed., (1975), pp. 5-13, 5-14.

*Primary Examiner*—Robert J. Hickey
*Attorney, Agent, or Firm*—D. R. Lackey

[57] ABSTRACT

A battery charging circuit for continuously charging a back-up battery is disclosed. A switch conducts a charging current to the battery in response to a temperature variable resistor. The charging current is a function of both the temperature and the battery voltage such that the charging current is matched to the charging characteristics of the battery. Additional features include the establishment of a minimum charging current and the capability of testing the battery under load conditions.

14 Claims, 2 Drawing Figures

TEMPERATURE COMPENSATED BATTERY CHARGING SYSTEM WITH TESTING FOR BATTERY BACK-UP SYSTEM

BACKGROUND OF THE INVENTION

1. Field of the Invention:

This invention is related generally to power supplies and specifically to battery charging systems for continuously charging a back-up battery.

2. Description of the Prior Art:

In many applications it is desirable to maintain the operation of equipment even if the main power source should fail. One such application is the measurement by a utility of electrical energy consumption. In this application, an event-logging system must remain operational in the event of a power failure so that the system clock can maintain correct real time information and the event-logging system can record information about the power outage itself. A battery back-up, or carry-over, is typically provided for this purpose.

In an event-logging system it is probable that the back-up battery will not be used for extended periods of time. However, since it is not known when the back-up battery will be needed, the battery should be fully charged and available at all times. One method of assuring the availability of the battery is to continuously charge the battery. The type of battery normally chosen to provide the battery back-up for an event-logging system is a nickel-cadmium battery.

Nickel-cadmium batteries are available in a variety of constructions and are the most widely-used of the small, sealed or maintenance free rechargeable batteries. However, the charging reaction of a nickel-cadmium battery is extremely temperature sensitive. At or above room temperature, 25° C., oxygen produced by the charging reaction chemically recombines thereby preventing the build-up of pressure. Below room temperature the oxygen does not recombine as readily thereby allowing pressure to build up. As pressure builds up the danger of venting is increased. Consequently, it is desirable to decrease the charge rate, or stop charging altogether, as the temperature drops.

Additionally, as the temperature increases, the charging efficiency decreases. At room temperature the charging efficiency is approximately 85%. At 80° C. the efficiency is approximately 40%. Thus, as the temperature increases, the charging current must increase in order to overcome the decrease in efficiency of the charging reaction.

SUMMARY OF THE INVENTION

The present invention is for a battery charging circuit for continuously charging a back-up battery. A constant regulated voltage produces a control current in response to a temperature variable resistance. The control current regulates a switch which conducts a charging current to the battery. The charging current is a function of both the temperature and the battery voltage. As the temperature increases, or the battery voltage decreases, the charging current increases. As the temperature decreases, the charging current decreases. The charging current is thus matched to the charging characteristics of the battery.

The present invention has additional features such as the maintenance of a minimum value for the charging current no matter how low the temperature drops. Another feature is the ability to electrically ground the charging current, place a test load across the battery, and read the battery voltage with the test load across the battery.

DESCRIPTION OF THE PREFERRED EMBODIMENT

Figure 1:
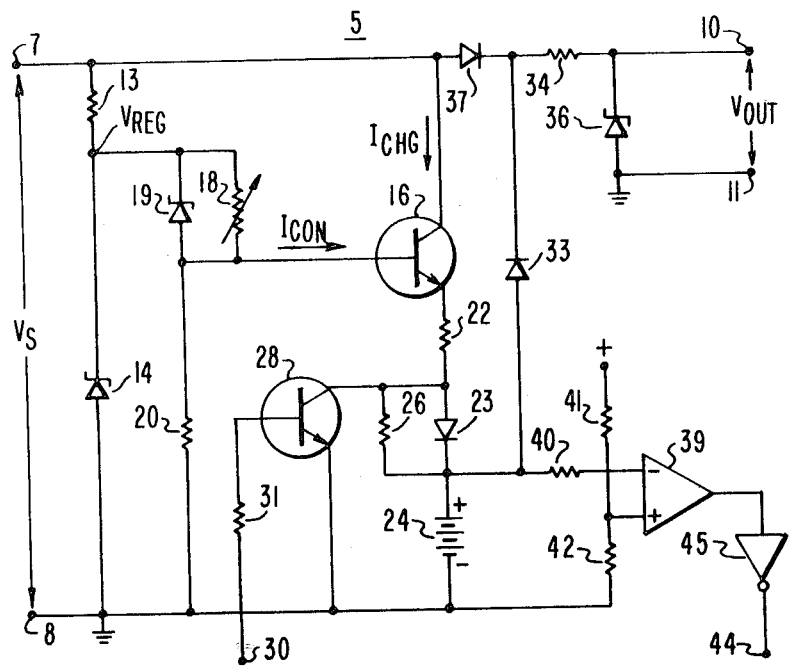
FIG. 1 is an electrical schematic of a battery charging circuit constructed according to the teachings of the present invention for continuously charging a back-up battery of an event-logging system.

In FIG. 1, an electrical schematic of a battery charging circuit 5 for continuously charging a back-up battery is shown. The circuit 5 has a pair of input terminals 7 and 8 adapted for connection to a source (not shown) of unregulated voltage $V_S$ and a pair of output terminals 10 and 11 adapted for connection to a load (not shown). The input terminal 8 and the output terminal 11 are at ground potential.

A resistor 13 and a zener diode 14 are series connected across the input terminals 7 and 8. The zener diode produces a regulated voltage $V_{REG}$ which is available at the junction of the resistor 13 and the zener diode 14. A transistor 16 has a base terminal connected to the junction of the resistor 13 and the zener diode 14 through the parallel combination of a thermistor 18 and a zener diode 19. The base terminal of the transistor 16 is also connected to ground through a resistor 20. An emitter terminal of the transistor 16 is connected to ground through the series combination of a resistor 22, a diode 23 and a battery 24. The transistor 16 has a collector terminal connected to the input terminal 7. The transistor 16 is used as a switch for conducting a charging current $I_{CHG}$. The conduction of the transistor 16 is controlled by a control current $I_{CON}$ which is produced predominantly by the cooperation of the thermistor 18 and the regulated voltage $V_{REG}$.

A resistor 26 is connected in parallel with the diode 23. The resistor 26 is used as a test load and has a value approximately one hundred times greater than the value of the actual load. A transistor 28 has a collector terminal connected to the junction of the resistor 22 and the diode 23. The transistor 28 has an emitter terminal connected to ground. In this configuration the transistor 28 is connected in parallel with the series combination of the resistor 26 and the battery 24. A base terminal of the transistor 28 is connected to a command input terminal 30 through a resistor 31. The transistor 28 is responsive to an externally generated command signal such as, but not limited to, a battery test signal produced by an event-logging system.

The battery 24 has a positive terminal connected to the output terminal 10 through the series combination of a diode 33 and a resistor 34. In this configuration the battery voltage is available at the output terminals 10 and 11 in the event the unregulated source voltage $V_S$ fails. The output terminal 10 is connected to ground through a zener diode 36 which regulates the unregulated source voltage $V_S$. The output terminal 10 is also connected to the input terminal 7 through the series combination of the resistor 34 and a diode 37. A regulated output voltage $V_{OUT}$ is available across the output terminals 10 and 11.

The positive terminal of the battery 24 is connected to an inverting input terminal of an operational amplifier 39. A non-inverting input terminal of the operational amplifier 39 is connected to a positive voltage source through a resistor 41 and is connected to ground through a resistor 42. An output terminal of the operational amplifier 39 is connected to a status output terminal 44 through an inverter/buffer 45. The operational amplifier 89 is a comparator which produces a battery status signal. The battery status signal may be input to an external system such as, but not limited to, an event-logging system. This concludes the description of the hardware shown in FIG. 1.

In operation the charging current $I_{CHG}$ produced by the circuit 5 shown in FIG. 1 is a function of both the temperature and the battery voltage. The thermistor 18 is a temperature variable resistance which has a negative temperature coefficient. An example of such a thermistor is Model No. VECO 23D18. This thermistor has the following characteristics:

| Temperature °C. | Resistance Ohms |
|---|---|
| −40 | 12K |
| 0 | 900 |
| 25 | 300 |
| 60 | 75 |

At normal operating temperatures the resistance value of the thermistor 18 is comparable to the resistance value of the resistor 20. The voltage drop across the thermistor 18 is less than the breakdown voltage of the zener diode 19 which appears as an open circuit to the regulated voltage source $V_{REG}$. Also, the impedance looking into the transistor 16 is approximately the coefficient of the current gain of the transistor times the value of the resistor 22. This impedance is substantially greater than the resistance value of the resistor 20. Therefore, at normal operating temperatures, the thermistor 18 and the resistor 20 form a simple voltage divider. With the thermistor 18 and the resistor 20 forming a voltage divider, the voltage available at the base of the transistor 16, and hence the control current $I_{CON}$, is dependent upon the temperature.

The transistor 16 is in an emitter follower configuration and has a voltage gain of one. Once the voltage at the base of the transistor 16 has been determined, the charging current $I_{CHG}$ can be determined. The base to emitter voltage drop of the transistor 16, the voltage drop across the diode 23 and the battery voltage 24 are all subtracted from the voltage at the base of the transistor 16. The voltage difference calculated from this subtraction is the voltage drop across the resistor 22. The magnitude of the charging current $I_{CHG}$ is determined by dividing the voltage across the resistor 22 by the resistance value of the resistor 22. The charging current $I_{CHG}$ flows into the positive terminal of the battery 24 thus charging the battery.

From the above analysis it can be seen that as the temperature increases the resistance value of the thermistor 18 decreases. This causes an increase in the voltage available at the base terminal of the transistor 16. When the voltage increases at the base of the transistor 16 the voltage drop across the resistor 22 must increase. In order for the voltage drop across the resistor 22 to increase the magnitude of the charging current $I_{CHG}$ must increase. Conversely, when the temperature drops the magnitude of the charging current $I_{CHG}$ also drops. In this manner, the value of the charging current $I_{CHG}$ is dependent upon the temperature.

The above analysis additionally reveals the relationship between the battery voltage and the charging current $I_{CHG}$. As the battery voltage decreases the voltage which must be dropped across the resistor 22 increases. As the voltage which must be dropped across the resistor 22 increases the magnitude of the charging current $I_{CHG}$ also increases. The magnitude of the charging current $I_{CHG}$ is therefore a function of the battery voltage as well as a function of the temperature.

One feature of the present invention is the maintenance of a minimum value for the charging current $I_{CHG}$ no matter how low the temperature drops. This function is provided by the zener diode 19. As discussed above, at normal operating temperatures the resistance value of the thermistor 18 is such that the voltage drop across the thermistor 18 is less than the breakdown voltage of the zener diode 19. However, as the temperature drops the resistance value of the thermistor 18 increases. This increase in value causes a greater voltage drop across the thermistor 18 and causes the value of the charging current $I_{CHG}$ to decrease. This process will continue until the voltage across the thermistor 18 equals the breakdown voltage of the zener diode 19. At this point the zener diode 19 becomes conductive and clamps the voltage across the thermistor 18 to the breakdown value of the zener diode 19. With the voltage across the thermistor 18 fixed by the zener diode 19 any additional drop in temperature will have no affect on the charging current $I_{CHG}$. In this manner a minimum value for the charging current $I_{CHG}$ may be maintained by choosing an appropriate value for the breakdown voltage of the zener diode 19.

A prototype of the battery charging circuit 5 shown in FIG. 1 has been built and tested. The part numbers and values for the various components are summarized in Table I hereinafter.

TABLE I

| COMPONENT VALUES | | |
|---|---|---|
| Component | Part No. | Value |
| Resistor 13 | — | 100Ω |
| Zener Diode 14 | 1N47 41A | 11 volts |
| Transistor 16 | 2N2219A | — |
| Thermistor 18 | VECO 23D18 | — |
| Zener Diode 19 | 1N749 | 4.3 volts |
| Resistor 20 | — | 890Ω |
| Resistor 22 | — | 100Ω |
| Diode 23 | 1N4148 | — |
| Battery 24 | — | 4.2 volts |
| Resistor 26 | — | 1KΩ |

The part numbers and values listed in Table I are exemplary in nature and not considered to be limiting features. The results of the test are illustrated in FIG. 2.

Figure 2:
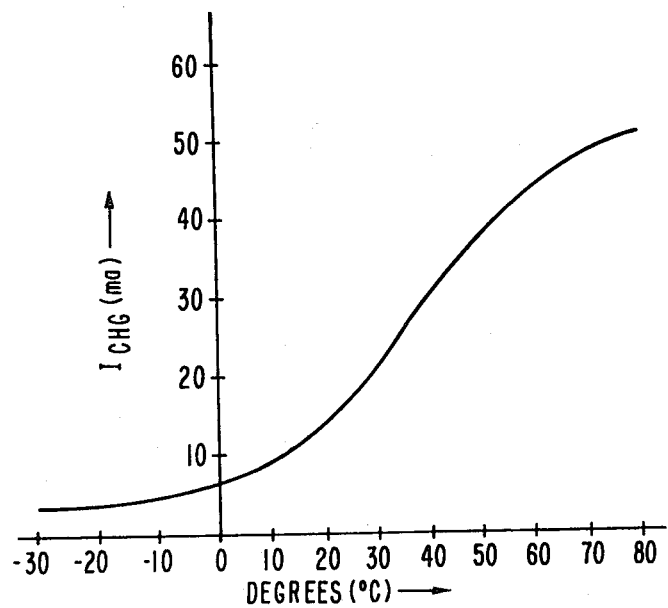
FIG. 2 is a graph of the charging current as a function of temperature.

In FIG. 2 a graph of the charging current as a function of temperature is shown. The battery 24 used for the test was a nickel-cadmium battery. As the temperature increases the value of the charging current $I_{CHG}$ increases to overcome decreases in the efficiency of the charging reaction. As the temperature decreases the value of the charging current $I_{CHG}$ decreases so that pressure will not build up from excessive oxygen. As the temperature decreases even further the breakdown voltage of the zener diode 19 is reached and the value of the charging current $I_{CHG}$ levels off. The test results illustrated in FIG. 2 graphically demonstrate how the charging current $I_{CHG}$ is matched to the charging characteristics of the battery 24.

The battery charging circuit 5 shown in FIG. 1 has an additional feature whereby the battery 24 may be electrically removed from the charging circuit 5, have a test load 26 placed across its terminals and have the battery voltage read under this test load condition without interrupting the regulated output voltage $V_{OUT}$. This feature is desirable whenever the charging circuit 5 is used in conjunction with another system such as, but not limited to, an event-logging system. The battery 24 is removed from the charging circuit 5 by causing the transistor 28 to become conductive. The transistor 28 is conductive whenever the battery test signal is received at the command input terminal 30. When the transistor 28 is conductive the junction of the resistor 22 and the diode 23 is grounded. With the junction of the resistor 22 and the diode 23 grounded the charging current $I_{CHG}$ no longer flows into the battery 24 and the resistor 26 is effectively connected across the terminals of the battery 24. Current therefore flows from the positive terminal of the battery 24 through the resistor 26 to ground. In this manner the battery 24 is effectively removed from the charging circuit 5 and the test load 26 is connected across the terminals of the battery 24.

With current flowing from the battery 24 through the resistor 26 to ground, a voltage is developed which is input to the operational amplifier 39. This voltage is compared to a voltage produced by the combination of the positive voltage source and a voltage divider comprised of resistors 41 and 42. The operational amplifier 39 produces the battery status signal in response to this comparison. The status of the battery may thus be read at output terminal 44. This concludes the description of the preferred embodiment.

Briefly reviewing, a battery charging circuit for continuously charging a back-up battery is disclosed. The circuit produces a charging current which is a function of both the temperature and the battery voltage. In this manner, the charging current is matched to the charging characteristics of the battery. The charging circuit disclosed herein also establishes a minimum value for the charging current such that the battery will continue to receive some charging current no matter how low the temperature drops. Further, it is anticipated that the present invention will be used in conjunction with external systems such as an event-logging system. Under these circumstances, it is advantageous to allow the event-logging system to electrically remove the battery from the charging circuit, place a test load across the battery terminals and read the battery voltage to determine the status of the battery.

I claim:

1. A temperature compensated circuit for charging and testing a back-up battery of an external system, comprising:

input terminals adapted for connection to a source of unregulated voltage;

output terminals adapted for connection to a load, said output terminals connected to said input terminals;

means for regulating the source voltage, said means connected across said input terminals, said means producing a regulated voltage;

a test load;

first switching means for conducting a charging current, said first switching means said test load and the battery being series connected across said input terminals;

a temperature variable resistance, said resistance cooperating with said regulated voltage to produce a control current regulating the conduction of said first switching means;

second switching means for electrically grounding said charging current in response to a signal generated by the external system, said second switching means electrically connected in parallel with the series combination of said battery and said test load such that when said charging current is grounded said test load is electrically connected across said battery; and means for reading the battery voltage, said battery connected to said output terminals such that said battery voltage is available at said output terminals in the event said source voltage fails.

2. The circuit of claim 1 wherein the charging current is a function of both the temperature and the battery voltage.

3. The circuit of claim 1 wherein the means for regulating includes the series combination of a resistor and a zener diode, said zener diode producing the regulated voltage.

4. The circuit of claim 1 wherein the test load includes a resistor, and including a diode, said diode connected in parallel with said resistor.

5. The circuit of claim 1 wherein the first switching means includes a transistor.

6. The circuit of claim 1 wherein the variable resistance includes a thermistor.

7. The circuit of claim 1 including means cooperating with the variable resistance to produce a constant charging current of minimum value.

8. The circuit of claim 7 wherein the means cooperating with the variable resistance includes a zener diode electrically connected in parallel with said variable resistance.

9. The circuit of claim 1 wherein the second switching means includes a transistor having a base terminal responsive to the signal generated by the external system and having a collector terminal connected to the junction of the series connection of the first switching means and the test load and having an emitter terminal connected to ground.

10. The circuit of claim 1 wherein the battery includes a nickel-cadmium battery.

11. The circuit of claim 1 wherein the external system includes an event-logging system.

12. The circuit of claim 1 wherein the means for reading the battery voltage includes a comparator responsive to both the battery voltage and a reference voltage, said comparator producing a battery status signal in response to said comparison.

13. The circuit of claim 1 wherein the battery has a positive terminal, and including a diode connecting said positive terminal to one of the output terminals such that the battery voltage is available at said output terminals.

14. The circuit of claim 1 including a zener diode connected across the output terminals for regulating the unregulated source voltage.

* * * * *